(No Model.)

R. A. RADFORD.
SULKY PLOW.

No. 300,892. Patented June 24, 1884.

WITNESSES
F. L. Ourand.
W. L. Harris.

INVENTOR
R. A. Radford
by C. A. Snow & Co.
Attorneys

UNITED STATES PATENT OFFICE.

ROBERT A. RADFORD, OF CENTRALIA, MISSOURI.

SULKY-PLOW.

SPECIFICATION forming part of Letters Patent No. 300,892, dated June 24, 1884.

Application filed April 12, 1884. (No model.)

*To all whom it may concern:*

Be it known that I, ROBERT A. RADFORD, a citizen of the United States, residing at Centralia, in the county of Boone and State of Missouri, have invented a new and useful Sulky-Plow, of which the following is a specification, reference being had to the accompanying drawings.

This invention has relation to sulky-plows; and it consists in the construction and novel arrangement of parts, as will be hereinafter fully described, and particularly pointed out in the claims appended.

Figure 1:
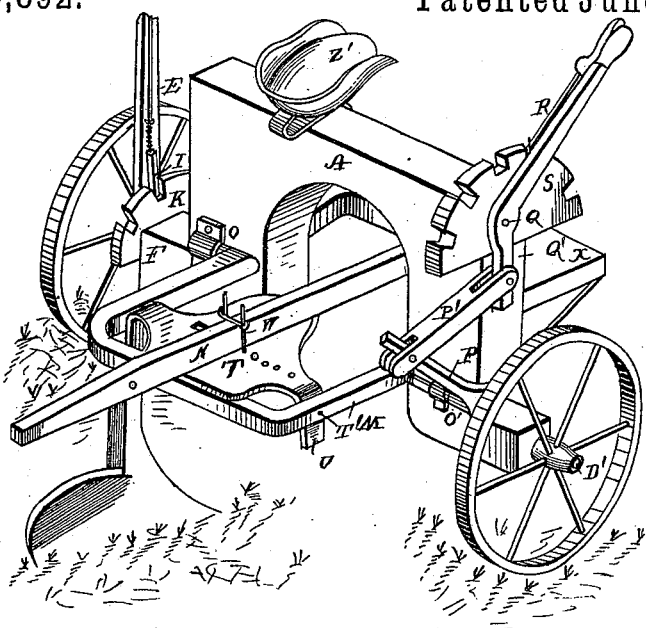
Figures 2, 3:
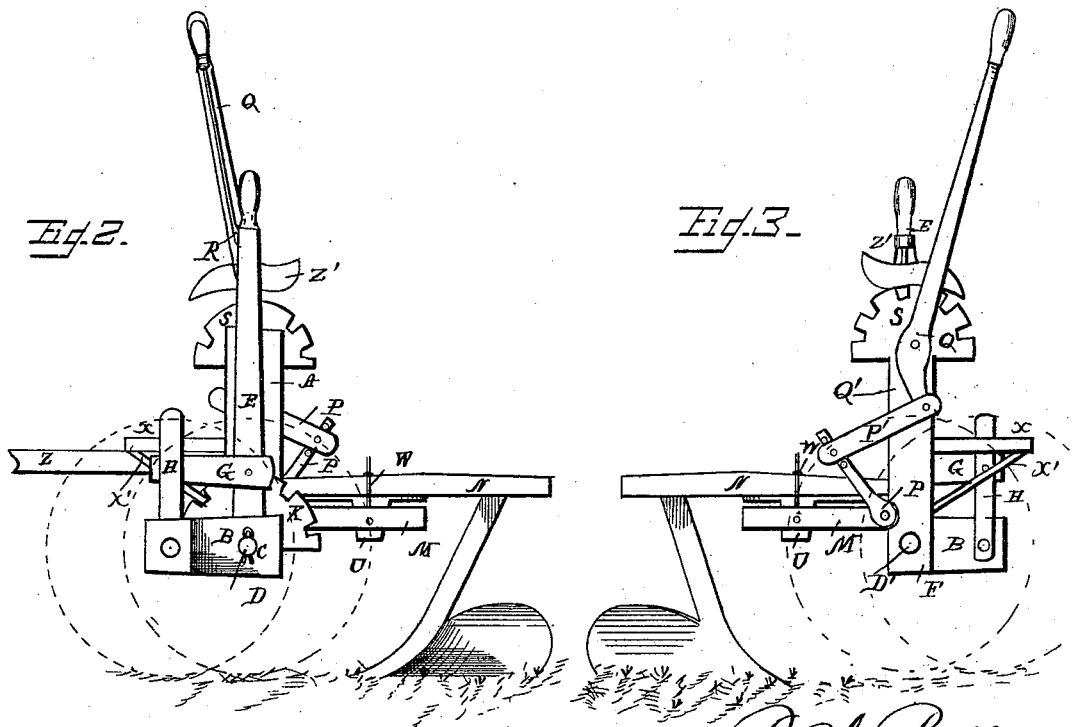

Figure 1 is a view in perspective of a sulky-plow embodying my improvements. Fig. 2 is a side elevation from the land-side wheel, and Fig. 3 is a side elevation from the furrow-wheel side.

Referring by letter to the accompanying drawings, A designates the arched axle, having a crank-journal, B, at one end, the sleeve C of which is journaled on a spindle, D, at that end of the arched axle. A lever, E, is fulcrumed on the spindle D, between the inner end of the sleeve C and a shoulder, F, on the axle, and is connected by two angle-arms, G and H, to the crank-journal B. This lever E is provided with a spring-pawl, I, which engages with an arc-rack, K, secured to the axle at the shoulder E, and by this lever the landside-wheel is adjusted so as to run on level land even with the furrow-side wheel or on the unplowed ground, while the furrow-wheel is lower, and at both times keep the seat of the plow level. The bail M, to which the plow-beam N is adjustably connected, is journaled in bearings O O' on the rear face of the arched axle, slightly above the line of the spindles D and D'. The end of the bail nearest the spindle D' projects through the box O', and is provided with an arm, P, the upper end of which is pivoted in a bifurcation in the lower end of the lever P', and the upper end of the lever P' is bifurcated and pivoted to the lower end of an angle-lever, Q, fulcrumed to the vertical arm Q' of the arched axle A, and provided with a spring-pawl, R, which engages the notches of an arc-rack, S, secured to the vertical arm Q' of the arched axle. By operating this lever Q the bail may be raised and lowered to take the plow out of the ground, or to let it down to enter the ground when the driver desires to plow.

T designates a perforated and slotted clevis-plate, which is pivoted on a rod, T', passing through the bail and through the downwardly-projecting arms U of the clevis-plate, to permit the plow-beam to oscillate. The plow-beam N, which may be either of wood or iron, is secured to the clevis-plate by a clevis, W, passing around the plow-beam and through the perforations in the clevis-plate. A foot-board, X, is secured to the front face of the arched axle, and is strengthened by braces X' X'. The tongue Z is secured to the foot-rest, which is at the same time a part of the main frame of the sulky. Z' is the driver's seat.

This plow is cheap, simple, and durable, and is easily adjusted to perform its work, or when it is necessary to drive from place to place.

Having thus fully described my invention, what I claim as new, and desire to secure by Letters Patent of the United States, is—

1. In a sulky-plow, the combination, with the arched axle provided with the spindle D and the arc-rack K, of the crank-journal B, the lever E, connected thereto by the angle-arms G H, and fulcrumed on the spindle D between the sleeve C and the shoulder L, and the spring-pawl I, substantially as specified.

2. The combination, with the bail M and its operating-levers, of the pivoted perforated clevis-plate, the clevis, and plow-beam, substantially as specified.

In testimony that I claim the foregoing as my own I have hereto affixed my signature in presence of two witnesses.

ROBERT A. RADFORD.

Witnesses:
  WILLIAM H. H. YOUNGER,
  JOHN CHAPMAN.